United States Patent Office 3,660,564
Patented May 2, 1972

3,660,564
INTERFERON INDUCTION
Masahiko Yoneda, Kobe, Hideaki Yaoi, Nara, Makoto Kida and Shinobu Matsuda, Osaka-fu, and Hideo Shirafuji, Kyoto-fu, Japan, assignors to Takeda Chemical Industries, Ltd., Osaka, Japan
No Drawing. Filed Dec. 23, 1969, Ser. No. 887,779
Claims priority, application Japan, Dec. 24, 1968, 43/94,828
Int. Cl. A61k 27/00
U.S. Cl. 424—85
13 Claims

ABSTRACT OF THE DISCLOSURE

A method for inducing interferon formation in vivo and in vitro. To a host or a tissue culture is administered a double-stranded complex of (a) heteropolynucleotide essentially consisting of inosinic acid and guanylic acid as its nucleotide units and (b) homopolynucleotide essentially consisting of cytidylic acid as its nucleotide unit, the heteropolynucleotide (a) being of a sedimentation constant falling within the range from about 2S to about 15S in terms of Svedberg units, and the ratio of the average number of the inosinic acid units therein being from about 0.7 to about 20 per unit of the guanylic acid.

---

This invention relates to interferon induction in vivo and in vitro. More particularly, this inventon relates to the inducing of interferon formation as well as the inducing of resistance to viral infection by administration of a specified double-stranded complex of (a) heteropolynucleotide essentially consisting of inosinic acid and guanylic acid as its nucleotide units and (b) homopolynucleotide essentially consisting of cytidylic acid as its nucleotide unit.

Interferon is a kind of protein which is produced in vertebrates when their cells are infected with a virus and which inhibits the replication of virus. It is known that the activity of an interferon is non-specific with regard to viruses and specific with regard to species of animals. In the current situation where there is no direct prophylatic or therapeutic measure against various viral infections, such an antiviral agent that is not much specific with regard to groups of viruses bears a clinically vital significance.

In view of the aforesaid strong specificity of interferon with respect to animal species in its inhibitory actvity against viral replication, the desideratum in virus chemotherapy research has been to find a highly active interferon inducer that will stimulate animal cells to produce interferon, which would then confer protection against virus infections.

Numerous interferon inducers have been reported including live or killed viruses, endotoxin, phytohemagglutinin, trachoma and double-stranded complexes of polyinosinic acid and polycytidylic acid. However, for each, very serious inadequacies, such as low activity, have limited their practicability for treatment of virus diseases.

It has now been found by the present inventors that high concentrations of interferons are induced in a host animal with the result that resistance of the host to viral infections is also induced, by administration of specified double-stranded complex of (a) heteropolynucleotide essentially consisting of inosinic acid and guanylic acid as its nucleotide units and (b) homopolynucleotide essentially consisting of cytidylic acid as its nucleotide unit. It has been also found that interferons are induced in a high concentration in a tissue culture by administration of the said double-stranded complex.

It is an object of the present invention to provide a method for inducing a high titre of interferons in a host or a tissue culture. Another object of the present invention is to provide a novel type of interferon inducers which are worthy of clinical evaluation. A further object of the present invention is to provide pharmaceutical compositions comprising the said interferon inducers. A further object of the present invention is to provide a process for the production of the interferon inducers.

The double-stranded complex of the heteropolynucleotide (a) and homopolynucleotide (b) to be employed as interferon inducer in the present invention can be easily prepared with the employment of raw materials which themselves are commercially available and can be made by per se established procedures.

For example, inosine-5′-diphosphate (hereinafter referred to as "IDP") and guanosine-5′-diphosphate (hereinafter referred to as "GDP") are subjected to copolymerization in the presence of polynucleotide phosphorylase, whereby the heteropolynucleotide (a) essentially consisting of inosinic acid and guanylic acid as its nucleotide units is produced. In this enzymatic copolymerization, there may be employed any known polynucleotide phosphorylase source, while, it has been found by the present inventors that there may be preferably employed as the polynucleotide phosphorylase source *Rhodopseudomonas spheroides*, *Sarcina lutea* or *Sarcina marginata*. As the typical examples of these microorganisms, there may be enumerated *Rhodopseudomonas spherodides* (ATCC No. 21455), *Sarcina lutea* (IFO No. 3232) and *Sarcina marginata* (IFO No. 3066). Throughout the present specification "IFO No." indicates an accession number of Institute for Fermentation Osaka (IF)), Osaka, Japan, and ATCC refers to American Type Culture Collection, Rockville, Md. As polynucleotide phosphorylase occurs in the cells of these microorganisms, those cells recovered from their culture broth may be employed as such. However, as the polynucleotide phosphorylast source, use can also be made of a processed material of the cells, such as those obtainable by suspending the cells into a suitable amount of a buffer (e.g. of pH 6.5 to 8.0) and treating the suspension with sonic oscillator, with ethylenediamine tetraacetic acid tetrasodium salt, with lysozyme, with a suitable organic solvent, or by homogenization.

Specifically, the said copolymerization may be carried out by adding the polynucleotide phosphorylase source to a solution of IDP and GDP in a buffer solution of pH about 6.5 to about 10 and keeping the resulting mixture at a temperature between about 30° C. and about 60° C. for about 0.5 to about 10 hours in the presence of magnesium ion and/or manganese ion. As the donor for such metal ion, there may be advantageously employed, for example, magnesium chloride, manganese chloride and the like.

The relation between the molar ratio in which IDP and GDP are mixed and the ratio of the average number of the inosinic acid units per unit of the guanylic acid in resulting heteropolynucleotides (a) is summarized in Table 1.

TABLE 1

| The molar ratio of IDP relative to GDP in preparation of (a): | Ratio [1] |
|---|---|
| 1:1 | 0.7–1.0 |
| 2:1 | 1.0–1.9 |
| 3:1 | 1.8–2.8 |
| 4:1 | 2.4–3.7 |
| 5:1 | 3.0–4.7 |
| 11:1 | 8.5–10.5 |
| 20:1 | 15.0–19.8 |

[1] The ratio of the average number of the inosinic acid units per unit of the guanylic acid in (a).

Thus produced heteropolynucleotide (a) may be easily recovered from the reaction mixture by per se known methods. For example, the heteropolynucleotide (a) may be precipitated by acidifying the reaction mixture or by the addition of a suitable organic solvent e.g. ethyl alcohol or methyl alcohol.

Thus-obtained heteropolynucleotide (a) is reacted with the homopolynucleotide (b) essentially consisting of cytidylic acid as its nucleotide unit to produce the double-stranded complex of the present invention. This reaction may be carried out according to per se established procedures to form double-strand between two polynucleotides. For example, the heteropolynucleotide (a) and the homopolynucleotide (b) are mixed for a short time, e.g. a minute, at ambient temperature in an aqueous buffer system having a broad pH range, i.e. between about 5 to 10 and containing about 0.001 to about 1 molar concentration of salts, such as 0.006 M sodium phosphate in 0.85% sodium chloride solution and 0.01 M glycylglycine in 0.59% sodium chloride. It is advantageous to add to the reaction system a magnesium ion donor and/or a sodium ion donor such as sodium chloride, magnesium chloride, disodium hydrogenphosphate and the like.

Thus-obtained complex may be confirmed as having double-strand formation between the heteropolynucleotide (a) and the homopolynucleotide (b) by, for example, a hypochromic shift in the ultraviolet absorption spectrum, sucrose density gradient fractionation or chromatography.

According to the present invention, from the viewpoint of interferon activity use is made of the double-stranded complex of the heteropolynucleotide (a) and the homopolynucleotide (b), in which the heteropolynucleotide (a) is of a sedimentation constant falling within the range from about 2S to about 15S in terms of Svedberg units and the ratio of the average number of the inosinic acid therein is from about 0.7 to about 20 per unit of the guanylic acid. More advantageously, use is made of such a double-stranded complex in which the heteropolynucleotide (a) is of a sedimentation constant falling within the range from about 4S to about 8S in terms of Svedberg units, and/or the ratio of the average number of the inosinic acid units in the heteropolynucleotide (a) is from about 1 to about 10 per unit of the guanylic acid.

The homopolynucleotide (b) in the double-stranded complex of the present invention may be oligocytidylic acid such as octacytidylic acid and cytidylcytidine.

The ratio of the homopolynucleotide (b) relative to the heteropolynucleotide (a) may be optional. Good results can be attained by the employment of the double-stranded complex, in which the total cytidylic acid units in the homopolynucleotide (b) is from about 0.5 to about 2, most advantageously about 1, per nucleotide unit of the heteropolynucleotide (a).

The production of interferon by administration of the double-stranded complex of the present invention is demonstrated by the protection of the host animals as well as tissue cultures against virus challenge. The interferon so produced also can be characterized by established methods followed by in vivo determination of its viral inhibiting properties and characterization by host specificity, trypsin sensitivity isoelectric point or molecular weight determination.

According to the present invention, the induction of interferon formation in vivo and/or the induction of resistance to viral infections is achieved by administering a double-stranded complex as described above to a host. The host may be warm-blooded animals such as mammals e.g. mice, bovine, pigs, dogs, horses, goats, sheep, men and birds, e.g. chicken, ducks, turkeys. The mode of administration can be parenterally such as subcutaneously, intramuscularly, intradermally, intraperitoneally, intravenously; or topically, preferably on a mucous membrane such as intranasally. Practically it is advantageous to administer the double-stranded complex to the host subcutaneously, intramuscularly, or intranasally.

Though the effective dose depends upon the host species, the mode of administration and on the virus against which the protection is expected, dose from about 1 microgram to about 2 milligrams per kilogram of the host generally gives the best results when administered subcutaneously or intramuscularly. At these doses there are no signs of toxicity either locally at the site of injection or in the well-being of the whole animal.

In preparing pharmaceutical compositions containing the double-stranded complex of the present invention, the double-stranded complex is admixed with a pharmaceutical carrier therefor so as to make the former a minor amount and the latter a major amount. The choice of the pharmaceutical carrier is determined by the preferred mode of the administration and standard pharmaceutical practice. In case of administration by injection such as subcutaneously or intramuscularly, there may be employed as the pharmaceutical carrier an injectable liquid. In case of topical application, there may be preferably employed as the carrier a liquid for topical application on mucous membrane of the warm-blooded animal.

The induction of interferon formation in a tissue culture can be achieved by administering the double-stranded complex to the tissue culture. As the tissue culture there may be preferably employed those of warm-blooded animals as mentioned above. The tissue may be of kidney, amnion, embryo, spleen, lung, and the like. They may be primary or secondary cultures obtained by per se established cultivation procedures. Practically, the administration is carried out by contacting the tissue cultures with the double-strand complex. This contact treatment may be advantageously carried out by adding the double-stranded complex or a solution of it to the culture fluid containing the tissue. Though the concentration of the double-stranded complex in the culture fluid may be chosen depending upon the kind of the tissue culture, the concentration from about 0.001 µg./ml. to about 1000 µg./ml. gives good results. This contact treatment may be advantageously carried out at a temperature from about 28° to about 40° C.

Thus-produced nietrferon may be recovered from the tissue culture by per se established procedures, and administered as such or in combination with a pharmaceutical carrier therefor to a warm-blooded animal of the same species as that of the tissue culture to induce resistance of the animal against various viral infections.

The following examples illustrate the typical production of the double-stranded complexes of the heteropolynucleotide (a) and the homopolynucleotide (b) that are used in the present invention. Throughout the present specification, parts by volume bear the same relationship to parts by weight as do milliliters to grams and percentages are weight per volume except the case where the meaning is clearly otherwise from the context.

EXAMPLE A (a) Preparation of the polynucleotide phosphorylase: Rhodopseudomonas spheroides (ATCC No. 21455) is inoculated onto 40 parts by volume of an aqueous culture medium comprising 1% of polypeptone, 1% of yeast extract 1% of potassium dihydrogenphosphate and 1% of glucose, and the medium is cultivated at 28° C. for 24 hours. 10 parts by weight of wet cells recovered from 200 parts by volume of the resulting culture broth is suspended into 30 parts by volume of 0.01 M-tris(hydroxymethyl)aminomethane buffer of pH 8.1 and the suspension is subjected to some oscillation at 10 kilocycles per second for 5 minutes. The cell debris are removed from the suspension by centrifugation. The supernatant is employed as the polynucleotide phosphorylase source.

(b) Preparation of the heteropolynucleotire (a): 10 parts by volume of the polynucleotide phosphorylase source mentioned above, $X_1$ parts by volume as set forth in Table 2 of a 40 mg./ml. aqueous solution of IDP, $Y_1$ parts by volume as set forth in Table 2 of a 40 mg./ml. aqueous solution of GDP, 10 parts by volume of 1 M-tris(hydroxymethyl)aminomethane buffer of pH 8.1, 5 parts by volume of 0.1 M-solution of magnesium chloride, and 5 parts by volume of 0.01 M-solution of ethylenediaminetetraacetic acid tetrasodium salt are admixed and incubated at 37° C. for 60 minutes.

After 150 parts by volume of 99% ethyl alcohol is added, the mixture is kept standing at 4° C. for 15 minutes to give precipitates. The precipitates are recovered by centrifugation, and dissolved in 25 parts by volume of distilled water. The solution is subjected three times to deproteinization with each 25 parts by volume of isoamyl alcohol. To thus treated aqueous solution is added ethyl alcohol so as to make its concentration 75% relative to the whole volume, together with 5 parts by volume of 1 M-sodium acetate solution of pH 5.4, whereby the heteropolynucleotide (a) is precipitated.

By the above-mentioned manner, the heteropolynucleotides (a) listed in Table 2 are obtained.

(c) Formation of double-strand between the heteropolynucleotide (a) and the homopolynucleotide (b): 50 parts by volume of a 5 mg./ml. solution of the heteropolynucleotide (a) as set forth in Table 2 in a 0.15 M NaCl-0.006M $Na_2HPO_4$ buffer soltuion and 50 parts by volume of a 5 mg./ml. solution of the homopolynucleotide (b) as set forth in Table 2 in the same buffer solution are admixed, whereby the double-strand complex of the heteropolynucleotide (a) and the homopolynucleotide (b) is formed.

Thus-obtained double-strand complexes are listed in Table 2.

methane buffer of pH 7.2 and the suspension is subjected to sonic oscillation at 10 kilocycles for 3 minutes. The cell debris are removed from the suspension by centrifugation. The supernatant is treated with 1000 parts by volume of Sephadex G-100 (trade name of dextran particles for gel-filtration, sold by Uppsala Co., Sweden) and is employed as the polynucleotide phosphorylase source.

(b) Preparation of the heteropolynucleotide (a): 10 parts by volume of the polynucleotide phosphorylase source, $X_2$ parts by volume as set forth in Table 3 of a 40 mg./ml. aqueous solution of IDP, $Y_2$ parts by volume as set forth in Table 3 of a 40 mg./ml. aqueous solution of GDP, 5 parts by volume of a 1 M-tris(hydroxymethyl)aminomethane buffer of pH 8.1, 5 parts by volume of 0.1 M-$MnCl_2$, 15 parts by volume of distilled water are admixed and incubated at 40° C. for 180 minutes.

After 200 parts by volume of ethyl alcohol is added, the mixture is kept standing at 4° C. for 20 minutes to give precipitates. The precipitates are recovered by centrifugation and is dissolved in 25 parts by volume of distilled water. The solution is subjected five times to deproteinization with each 25 parts by volume of phenol saturated with water. After phenol remaining in the aqueous solution is removed with diethyl ether, to the aqueous solution is added ethyl alcohol so as to make its concentration 70% relative to the whole volume, together with 5 parts by volume of 1 M-sodium acetate solution of pH 5.4, whereby the heteropolynucleotide (a) is precipitated.

By the above-mentioned manner, the heteropolynucelotides (a) listed in Table 3 are obtained.

(c) Formation of double-strand between the hetero-

TABLE 2

Double-stranded complex of the heteropolynucleotide (a) and the homopolynucleotide (b)

| Sample No. | The heteropolynucleotide (a) | | | | The homopolynucleotide (b) | Ratio of (b)/(a) [3] |
|---|---|---|---|---|---|---|
| | $X_1$ | $Y_1$ | Ratio of I/G in (a) [1] | Sedimentation constant of (a) [2] | | |
| 1 | 10 | 10 | 0.7 | 7.5S | Poly. C.[4] of 6S | About 1. |
| 2 | 13 | 7 | 1.9 | 4.5S | Poly. C. of 4S | Do. |
| 3 | 15 | 5 | 2.4 | 7S | Poly. C. of 6S | Do. |
| 4 | 16 | 4 | 2.8 | 5S | Poly. C. of 5S | Do. |
| 5 | 16.7 | 3.3 | 3.5 | 6S | Poly. C. of 6S | Do. |
| 6 | 18.3 | 1.7 | 10.2 | 5.5S | Poly. C. of 5S | Do. |
| 7 | 18.3 | 1.7 | 10.2 | 4.5S | Cytidylcytidine | Do. |
| 8 | 19.1 | 0.9 | 18.0 | 6.5S | Poly. C. of 6S | Do. |

[1] The ratio of the average number of the inosinic acid units per unit of the guanylic acid in (a).
[2] Sedimentation constant of (a) in terms of Svedberg units.
[3] The ratio of the total cytidylic acid units in (b) per nucleotide unit of (a).
[4] Polycytidylic acid.

EXAMPLE B (a) Preparation of the polynucleotide phosphorylase source: *Sarcina lutea* (IFO No. 3232) is inoculated onto 40 parts by volume of an aqueous culture medium comprising 0.5% of yeast extract, 0.2% of corn steep liquor, 0.2% of potassium dihydrogenphosphate, 0.05% of magnesium chloride and 0.5% of sucrose, and the medium is cultivated at 28° C. for 18 hours. 17 parts by weight of wet cells recovered from 200 parts by volume of the culture broth thus incubated is suspended into 50 parts by volume of 0.02 M-tris(hydroxymethyl)aminopolynucleotide (a) and the homopolynucleotide (b): 50 parts by volume of a 5 mg./ml. solution of the heteropolynucleotide (a) as set forth in Table 3 in a 0.15 M NaCl-0.006 M $Na_2HPO_4$ buffer solution and 50 parts by volume of a 5 mg./ml. solution of the homopolynucleotide (b) as set forth in Table 3 in the same buffer solution are admixed, whereby the double-stranded complex of the heteropolynucleotide (a) and the homopolynucleotide (b) is formed.

Thus-obtained double-stranded complexes are listed in Table 3.

TABLE 3

Double-stranded complex of the heteropolynucleotide (a) and the homopolynucleotide (b)

| Sample No | The heteropolynucleotide (a) | | | | The homopolynucleotide (b) | Ratio of (b)/(a) [3] |
|---|---|---|---|---|---|---|
| | $X_2$ | $Y_2$ | Ratio of I/G in (a) [1] | Sedimentation constant of (a) [2] | | |
| 9 | 10 | 10 | 0.8 | 10S | Poly. C.[4] of 10S | About 1. |
| 10 | 13 | 7 | 1.2 | 8S | Poly. C. of 8S | Do. |
| 11 | 15 | 5 | 1.8 | 11S | Poly. C. of 10S | Do. |
| 12 | 16 | 4 | 2.4 | 12S | do | Do. |
| 13 | 16.7 | 3.3 | 3.2 | 9S | Poly. C. of 9S | Do. |
| 14 | 18.3 | 1.7 | 8.8 | 8S | Poly. C. of 8S | Do. |
| 15 | 18.3 | 1.7 | 8.8 | 10S | Poly. C. of 10S | Do. |
| 16 | 19.1 | 9.9 | 16.3 | 9S | Poly. C. of 9S | Do. |

See footnotes at end of Table 2.

The following examples are merely intended to demonstrate the induction of interferon, by the administration of typical double-stranded complexes of the heteropolynucleotide (a) and the homopolynucleotide (b), in living host animals and in tissue cultures.

EXAMPLE 1

5 μg./md. solution of each double-stranded complex listed in Tables 2 and 3 in the phosphate buffered saline [1] was intravenously administered to rabbits weighing about 2000 to about 2500 grams in a dose of 5 μg./rabbit of the complex. After two hours, blood samples were taken from each rabbit by cardiac puncture. Serum was separated from each of the clotted samples by centrifugation at 1,500 r.p.m. for 5 minutes.

The serum from each rabbit was diluted with the maintenance medium (2% bovine serum lactalbumin Hanks' BSS [2]) by serial two-fold dilutions from 1:5–1:5120. A 2 ml. sample of each dilution is added to 4 tube cultures of rabbit kidney cells, from which the growth medium (10% bovine serum lactalbumin Hanks' BSS [2]) had been removed. Each tube was kept standing at 36° C. for 16 hours. After the serum sample was removed from each tube, 2 ml. of the maintenance medium was added to each tube. Cultures in the respective tubes were infected with 100 TCID$_{50}$ (50% tissue culture infectrous dose) of Vesicular Stomatitis Virus, incubated at 36° C. for an additional 48 hours, and then observed for evidence of viral cytopathic effects.

The interferon titre of each serum sample was determined as the reciprocal of the serum dilution at which 50% of the tube cultures show no cytopathic effect.

The results are summarized in Table 4.

---

[1] The phosphate buffered saline consists of:

| | Grams |
|---|---|
| NaCl | 8.0 |
| KCl | 0.2 |
| Na$_2$HPO$_4$ | 1.15 |
| KH$_2$PO$_4$ | 0.2 |
| CaCl$_2$ | 0.1 |
| MgCl$_2$·6H$_2$O | 0.1 |
| Distilled water up to 1 liter. | |

[2] 2% bovine serum lactalbumin Hanks' BSS is prepared by admixing 20 ml. of bovine serum with Lactalbumin Hanks' solution to make the total 1 liter. Lactalbumin Hanks' solution is prepared by dissolving 5 g. of Lactalbumin hydrolyzate in the Hanks' balanced solution of the following composition to make the total 1 liter:

| | G. |
|---|---|
| NaCl | 8.0 |
| KCl | 0.4 |
| CaCl$_2$ | 0.2 |
| MgSO$_4$·7H$_2$O | 0.2 |
| Na$_2$HPO$_4$·2H$_2$O | 0.06 |
| KH$_2$PO$_4$ | 0.06 |
| NaHCO$_3$ | 0.25 |
| d-Glucose | 1.0 |
| Phenol red | 0.02 |
| Distilled water (triple-distilled), an amount to make the total 1 liter. | |

[3] 10% bovine serum lactalbumin Hanks' BSS is prepared by admixing 100 ml. of bovine serum with the Lactalbumin Hanks' solution to make the total 1,000 ml.

TABLE 4

| Double-stranded complex as recited by Sample Number in Tables 2 and 3: | Interferon titre of rabbit serum |
|---|---|
| 1 | 1280 |
| 2 | 5120 |
| 3 | 2560 |
| 4 | 2560 |
| 5 | 2560 |
| 6 | 2560 |
| 7 | 2560 |
| 8 | 1280 |
| 9 | 1280 |
| 10 | 5120 |
| 11 | 2560 |
| 12 | 2560 |
| 13 | 2560 |
| 14 | 2560 |
| 15 | 2560 |
| 16 | 1280 |

As the control samples, various double-stranded complexes listed in Table 5 were prepared just after the manner described in Examples A or B and their induction of interferon in rabbit were determined just after the manner described above.

The results are summarized in Table 5.

TABLE 5

| Control No. | Double-stranded complex | | Example | Interferon titre in rabbit serum |
|---|---|---|---|---|
| | Polynucleotide instead of the heteropolynucleotide (a) | Polynucleotide instead of the homopolynucleotide (b) | | |
| 1 | Poly. G. | Poly. C. | A | 0 |
| 2 | A$_{11}$C$_1$ | Poly. I. | B | 0 |
| 3 | A$_5$C$_1$ | Poly. I. | B | 0 |
| 4 | A$_1$C$_{11}$ | Poly. I. | B | 160 |
| 5 | Poly. I. | Poly. C. | A | 640 |
| 6 | Poly. I. | Poly. C$_3$ | B | 320 |
| 7 | A$_1$X$_3$ | Poly. I. | B | 0 |
| 8 | C$_1$X$_1$ | Poly. I. | B | 0 |
| 9 | C$_1$G$_1$ | Poly. I. | A | 0 |
| 10 | A$_1$I$_5$ | Poly. C. | A | 0 |
| 11 | I$_{23}$A$_1$ | Poly. C. | A | 160 |
| 12 | I$_{11}$A$_1$ | Poly. C. | A | 40 |
| 13 | I$_5$A$_1$ | Poly. C. | A | <10 |
| 14 | I$_{23}$C$_1$ | Poly. C. | A | 160 |
| 15 | I$_{11}$C$_1$ | Poly. C. | A | 40 |
| 16 | I$_5$C$_1$ | Poly. C. | A | <10 |

"A," "C," "X," "G" and "I" represent, respectively adenylic acid units, cytidylic acid units, xanthylic acid units, guanglic acid units and inosinic acid units in the polynucleotide. The numerals given as subscripts thereto denote the molar ratios of the starting nucleoside-5'-diphosphates corresponding to the nucleotide units.

Thus, for example, the indication of the employed polynucleotide "A$_{11}$C$_1$," is to be construed as meaning the heteropolynucleotide produced from adenosine-5'-diphosphate and cytidine-5'-diphosphate in a molar ratio of 11:1. The same rule applies to other indications. "Poly. I.," "Poly. C." and "Poly. G." mean polyinosinic acid, polycytidylic acid and polyguanylic acid, respectively.

EXAMPLE 2

To 4 tube cultures of rabbit kidney cells, from which the growth medium had been removed, there was added 2 ml. of the maintenance medium [2] containing various concentrations of solutions of the double-stranded complex listed as Sample 2 in Table 2 in the phosphate buffered saline [1], and each tube was kept standing at 36° C. for 16 hours. After the sample solution was removed from each tube, new 2 ml. of the maintenance medium was added to each tube. Cells in each tube were infected with 100 $TCID_{50}$ of Vesicular Stomatitis Virus, and incubated at 36° C. for an additional 48 hours, and then observed for evidence of viral cytopathic effects.

Thus, the concentration of Sample 2, at which 50% of the tube cultures show no cytopathic effect, was determined as 0.1 μg./ml.

The same procedure revealed that the concentration of the double-stranded complex of polyinosinic acid and polycytidylic acid listed as Control 5 in Table 5, at which 50% of the tube cultures showw no cytopatic effect, is 0.65 μg./ml.

ly 250 parts by volume of diethylaminoethyl cellulose to give 60 parts by volume of polynucleotide phosphorylase solution.

In the presence of 12 parts by volume of the polynucleotide phosphorylase solution, a 40 mg./ml. aqueous solution of IDP and a 40 mg./ml. aqueous solution of GDP in the ratio listed in Table 7 are treated after the manner described in (b) of Example A to yield the heteropolynucleotide (a) described in the same table.

Thus-obtained heteropolynucleotide (a) is reacted with the homopolynucleotide (b) after the manner described in (c) of Example A to yield the double-stranded complexes listed in Table 7.

14–18 gram mice were infected with Japanese Encephalitis Viruses.

24 hours after the infection, each of samples listed in Table 7, each being employed as a 150 μg/ml. solution in the phosphate buffered saline, was administered intravenously to 20 mice in a total dose per animal of 30 μg.

Mice were observed for 21 days. The results are summarized in Table 7.

TABLE 7

Double-stranded complex of the heteropolynucleotide (a) and the homopolynucleotide (b)

| The molar ratio [1] | The heteropolynucleotide (a) | | | Sedimentation constant of (b) | Ratio of (b)/(a) | Percent survival | Average survival days |
|---|---|---|---|---|---|---|---|
| | Ratio of IG/ in (a) | Sedimentation constant of (a) | | | | | |
| 11 | 9.8 | 4S | | 4S | About 1 | 40 | 14.6 |
| 4 | 2.8 | 6S | | 5S | ---do------- | 65 | 15.0 |
| 2 | 1.2 | 4S | | 4S | ---do------- | 40 | 16.0 |
| 1 | 0.8 | 7S | | 5S | ---do------- | 55 | 13.6 |
| Poly. I. of 5S | | | | 4S | ---do------- | 36 | 12.0 |
| Not administered | | | | | | 0 | 10.8 |

[1] The molar ratio of IDP relative to GDP in preparing (a).

EXAMPLE 3

18–20 gram mice were infected with Influenza Virus Type A, Strain PR8: 3 hours after the infection, each of Samples 10 and 12 listed in Table 3 and Control 6 listed in Table 5, each being employed as a 1500 μg./ml. solution in the phosphate buffered saline [1], was administered intransally to 20 mice in a total dose per animal of 30 μg.

Mice were observed for 14 days. The results are summarized in Table 6.

TABLE 6

| Sample | Survival days | Percent survival |
|---|---|---|
| Not administered | 6.5–7.1 | 0 |
| Control 6 | 10.3–11.3 | 30 |
| Sample 12 | 12.0–13.6 | 50 |
| Sample 10 | 11.8–13.4 | 70 |

EXAMPLE 4

*Sarcina marginata* (IFO 3066) is inoculated onto 40 parts by volume of an aqueous culture medium comprising 1.2% of polypeptone, 0.5% of dried yeast cells, 0.8% of $KH_2PO_4$, 0.2% of $K_2HPO_4$ and 1.5% of glucose, and the medium is cultivated at 28° C. for 18 hours. 15 parts by weight of wet cells recovered from 200 parts by volume of the culture broth is suspended into 30 parts by volume of 0.05 M-tris(hydroxymethyl)aminomethane buffer of pH 7.5 and the suspension is sonicated at 10 kilocycles for 30 minutes. The mixture is subjected to centrifugation and the supernatant liquid is treated with 100 parts by volume of Sephadex G-100 and subsequent- Having thus disclosed the invention, what is claimed is:

1. A method for inducing interferon formation in a warm blooded animal which comprises administering to the said animal an amount effective to induce interferon formation in said animal of a double-stranded complex of (a) heteropolynucleotide essentially consisting of inosinic acid and guanylic acid as its nucleotide units and (b) homopolynucleotide essentially consisting of cytidylic acid as its nucleotide unit, the teteropolynucleotide (a) being of a sedimentation constant falling within the range from about 2S to about 15S in terms of Evedberg units, and the ratio of the average number of the inosinic acid units therein being from about 0.7 to about 20 per unit of the guanylic acid.

2. A method for inducing interferon formation according to claim 1, wherein the double-stranded complex is administered to the warm-blooded animal in a dose from about 1 microgram to about 2 milligrams per kilogram of the animal.

3. A method for inducing interferon formation according to claim 1, wherein the administration is carried out by means of injection.

4. A method for inducing interferon formation according to claim 1, wherein the administration is carried out by means of topical application on mucous membrane of the animal.

5. A method for inducing interferon formation according to claim 1, wherein the heteropolynucleotide (a) is of a sedimentation constant falling within the range from about 4S to about 8S.

6. A method for inducing interferon formation according to claim 1, wherein the ratio of the average number of the inosinic acid units is from about 1 to about 10 per unit of the guanylic acid.

[2] See footnote 2, col. 7.
[1] See footnote 1, col. 7.
[1] See footnote 1, col. 7.

7. A method for inducing interferon formation according to caim 1, wherein the ratio of the total cytidylic acid units in the homopolynucleotide (b) is from about 0.5 to about 2 per nucleotide unit of the heteropolynucleotide (a).

8. A method of inducing interferon formation according to claim 7, wherein the ratio is about 1.

9. A method for inducing interferon formation in the tissue culture of a warm blooded animal which comprises administering to said tissue culture an amount effective to induce interferon formation in said tissue culture of a double-stranded complex of (a) heteropolynucleotide essentially consisting of inosinic acid and guanylic acid as its nucleotide units and (b) homopolynucleotide essentially consisting of cytidylic acid as its nucleotide unit, the heteropolynucleotide (a) being of a sedimentation constant falling within the range from about 2S to about 15S in terms of Svedberg units, and the ratio of the average number of the inosinic acid units therein being from about 0.7 to about 20 per unit of the guanylic acid.

10. A method for inducing interferon formation according to claim 9, wherein the heteropolynucleotide (a) is of a sedimentation constant falling within the range from about 4S to about 8S.

11. A method for inducing interferon formation according to claim 9, wherein the ratio of the average number of the inosinic acid units is from about 1 to about 10 per unit of the guanylic acid.

12. A method for inducing interferon formation according to claim 9, wherein the ratio of the total cytidylic acid units in the homopolynucleotide (b) is from about 0.5 to about 2 per nucleotide unit of the heteropolynucleotide (a).

13. A method for inducing interferon formation according to claim 12, wherein the ratio is about 1.

References Cited

Field et al., Proc. National Academy of Science, vol. 58, pp. 1004–10 (1967).

Maeda et al., Bulletin of the Chemical Society of Japan, vol. 40, pp. 2068–2072 (1967).

RICHARD L. HUFF, Primary Examiner

U.S. Cl. X.R.

195—28; 424—180